(12) United States Patent
Salehi et al.

(10) Patent No.: US 10,218,540 B2
(45) Date of Patent: Feb. 26, 2019

(54) TRANSMITTER FOR TRANSMITTING A HIGH-RATE DATA TRANSMISSION THROUGH DIRECT EXCITATION

(71) Applicant: Virginia Tech Intellectual Properties, Inc., Blacksburg, VA (US)

(72) Inventors: Mohsen Salehi, Woobury, MN (US); Majid Manteghi, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 418 days.

(21) Appl. No.: 15/106,159

(22) PCT Filed: Dec. 18, 2014

(86) PCT No.: PCT/US2014/071243
§ 371 (c)(1),
(2) Date: Jun. 17, 2016

(87) PCT Pub. No.: WO2015/095573
PCT Pub. Date: Jun. 25, 2015

(65) Prior Publication Data
US 2016/0315790 A1 Oct. 27, 2016

Related U.S. Application Data

(60) Provisional application No. 61/917,697, filed on Dec. 18, 2013.

(51) Int. Cl.
*H04B 1/04* (2006.01)
*H03M 11/00* (2006.01)
(Continued)

(52) U.S. Cl.
CPC ............... *H04L 15/04* (2013.01); *H04B 1/04* (2013.01); *H04B 1/38* (2013.01)

(58) Field of Classification Search
CPC ...... H02M 5/45; H02M 5/4505; H02M 5/451; H02M 5/452; H02M 5/458; H02M 5/4585; H03K 5/19; H03L 7/00; H03L 7/1803; H04L 7/00; H04L 7/06; H04L 12/56; H04L 2012/5674; H04L 13/00; H04L 27/00;
(Continued)

(56) References Cited

U.S. PATENT DOCUMENTS

2003/0117270 A1 6/2003 Dimmer et al.
2004/0113790 A1 6/2004 Hamel et al.
(Continued)

*Primary Examiner* — Blane Jackson
(74) *Attorney, Agent, or Firm* — Blank Rome LLP

(57) ABSTRACT

One aspect is a circuit for tuning a resonance frequency of an electrically small antenna and directly exciting the electrically small antenna. The circuit includes a first source configured for providing a constant voltage. The circuit also includes an antenna and a switched capacitor configured for being alternatively alternately coupled to the first source to be charged thereby and to the antenna for exciting the antenna. Another aspect is a transmitter for transmitting a wireless signal using an antenna without using a variable voltage source to excite the antenna. The transmitter includes a first source configured for providing a constant voltage. The transmitter further includes an antenna and a switched capacitor configured for being alternately coupled to the first source to be charged thereby and to the antenna for exciting the antenna and for tuning a resonance frequency of the antenna.

18 Claims, 21 Drawing Sheets

(51) Int. Cl.
*H04L 13/00* (2006.01)
*H01Q 9/04* (2006.01)
*H04L 15/04* (2006.01)
*H04B 1/38* (2015.01)

(58) Field of Classification Search
CPC ... H04B 3/50; H04B 3/54; H04B 1/04; H04B 1/59; G06F 1/08; G06F 11/1604; H01Q 9/04; H01Q 9/045; H03M 11/00
USPC ....... 375/219, 220, 222, 257, 354, 356, 362, 375/364, 369
See application file for complete search history.

(56) References Cited

U.S. PATENT DOCUMENTS

| | | |
|---|---|---|
| 2005/0017602 A1 | 1/2005 | Arms et al. |
| 2006/0197711 A1 | 9/2006 | Sekiguchi et al. |
| 2007/0216590 A1 | 9/2007 | Montgomery et al. |
| 2007/0236219 A1 | 10/2007 | Deimling et al. |
| 2010/0079288 A1 | 4/2010 | Collins et al. |
| 2012/0183097 A1 | 7/2012 | Ishizaki |

TRANSMITTER FOR TRANSMITTING A HIGH-RATE DATA TRANSMISSION THROUGH DIRECT EXCITATION

CROSS REFERENCE TO RELATED APPLICATIONS

This application is a national phase of PCT/US2014/071243, filed on Dec. 18, 2014, which claims the benefit of U.S. Provisional Application No. 61/917,697, entitled "Electro-Mechanical Radio Frequency Transmitter" and filed Dec. 18, 2013, the contents of which applications are incorporated herein by reference.

FIELD OF THE INVENTION

The present invention relates to a transmitter for high-rate data transmission and, more specifically, to a transmitter for transmitting a high-rate data transmission through direct excitation of an antenna.

BACKGROUND OF THE INVENTION

Spark-gap transmitters are known as the oldest transmitters and date from the 1880s. Illustrated in FIG. 14 is a conventional spark-gap transmitter 1400 comprising an induction coil 1450 having a primary coil and a secondary coil. The transmitter 1400 further comprises a spark gap 1420 connected in parallel with the secondary coil of the induction coil 1450. The transmitter 1400 further comprises a tuning coil 1460 connected to one or more Leyden jars 1410 in series. The tuning coil 1460 and the one or more Leyden jars 1410 are together connected in parallel with the spark gap 1420. The secondary coil of the induction coil 1450 and the one or more Leyden jars 1410 together form an LC resonator. The tuning coil 1480 is connected to group 1470 and to an antenna 1480.

The tuning circuit 1400 further comprises a telegraph key 1430 and one or more batteries 1440 connected in series. The telegraph key 1430 and the one or more batteries 1440 are together connected in parallel with the primary coil of the induction coil 1450. The telegraph key 1430 selectively couples and decouples the batteries 1440 from the primary coil of the induction coil 1450 to provide an instantaneous high-voltage pulse to the spark gap 1420. When a spark takes place across a narrow gap of the spark gap 1420, the spark energy will be released in the form of heat and electromagnetic radiation to transmit a wireless signal. The signal may be encoded with Morse code.

Illustrated in FIG. 15 is a conventional receiver 1500 comprising a head telephone receiver 1510, a crystal detector 1520, a variable condenser, and a two slider tuning coil 1560 comprising a coil, a first slider, and a second slider. The coil of the two slider tuning coil 1560 is connected to an antenna 1580. The first slider is connected to ground 1570, and the second slider is connected to one port of the variable condenser 1530. The other port of the variable condenser 1530 is connected to one port of the crystal detector 1520. The other port of the crystal detector 1520 is connected to the group 1570. The head telephone receiver 1510 is connected in parallel with the crystal detector 1520. The receiver 1500 receives the Morse code signal transmitted by the transmitter 1400.

SUMMARY OF THE INVENTION

In accordance with an aspect of the present invention, there is provided a circuit for tuning a resonance frequency of an electrically small antenna and directly exciting the electrically small antenna. The circuit includes a first source configured for providing a constant voltage. The circuit also includes an antenna and a switched capacitor configured for being alternatively alternately coupled to the first source to be charged thereby and to the antenna for exciting the antenna.

In accordance with another aspect of the present invention, there is provided a transmitter for transmitting a wireless signal using an antenna without using a variable voltage source to excite the antenna. The transmitter includes a first source configured for providing a constant voltage. The transmitter further includes an antenna and a switched capacitor configured for being alternately coupled to the first source to be charged thereby and to the antenna for exciting the antenna and for tuning a resonance frequency of the antenna.

BRIEF DESCRIPTION OF THE DRAWINGS

For the purpose of illustration, there are shown in the drawings certain embodiments of the present invention. In the drawings, like numerals indicate like elements throughout. It should be understood that the invention is not limited to the precise arrangements, dimensions, and instruments shown. In the drawings.

DETAILED DESCRIPTION OF THE INVENTION

Figure 1A:
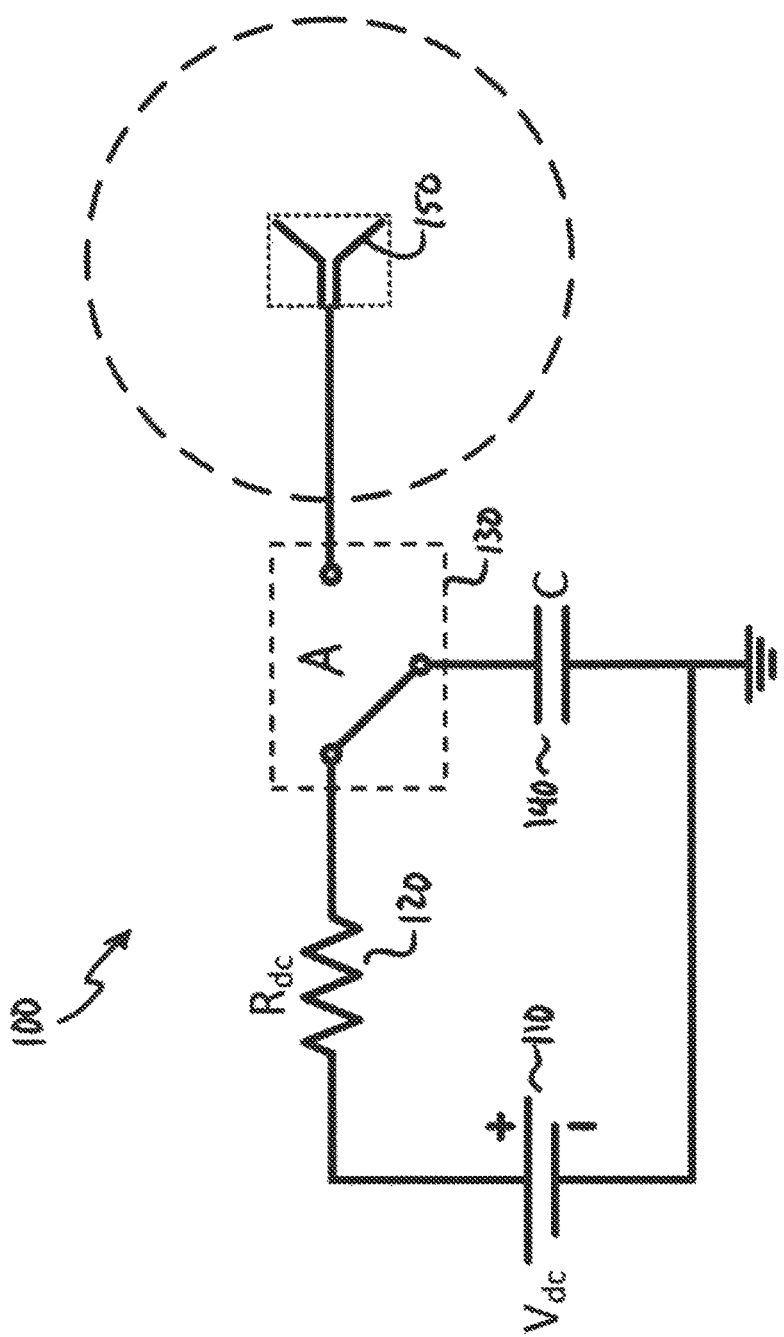
FIGS. 1A-1B illustrate a transmitter configured for transmitting data through direct excitation of an antenna, in accordance with an exemplary embodiment of the present invention.

Reference to the drawings illustrating various views of exemplary embodiments of the present invention is now made. In the drawings and the description of the drawings herein, certain terminology is used for convenience only and is not to be taken as limiting the embodiments of the present invention. Furthermore, in the drawings and the description below, like numerals indicate like elements throughout.

A spark-gap transmitter is advantageous in that it does not require a periodic signal to power its antenna. However, the use of a telegraph key does not provide for high-data-rate transmissions.

Figure 1B:
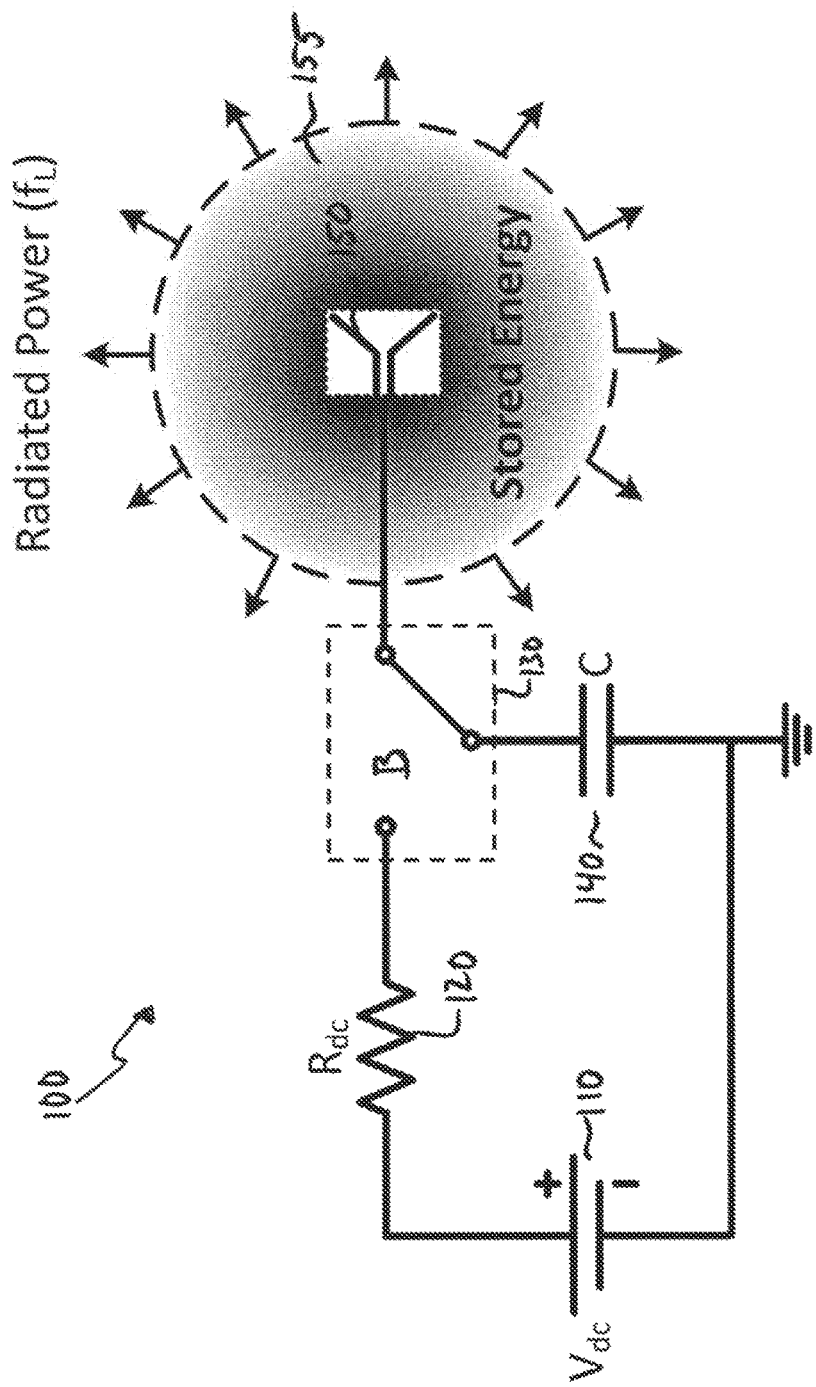
Figure 1C:
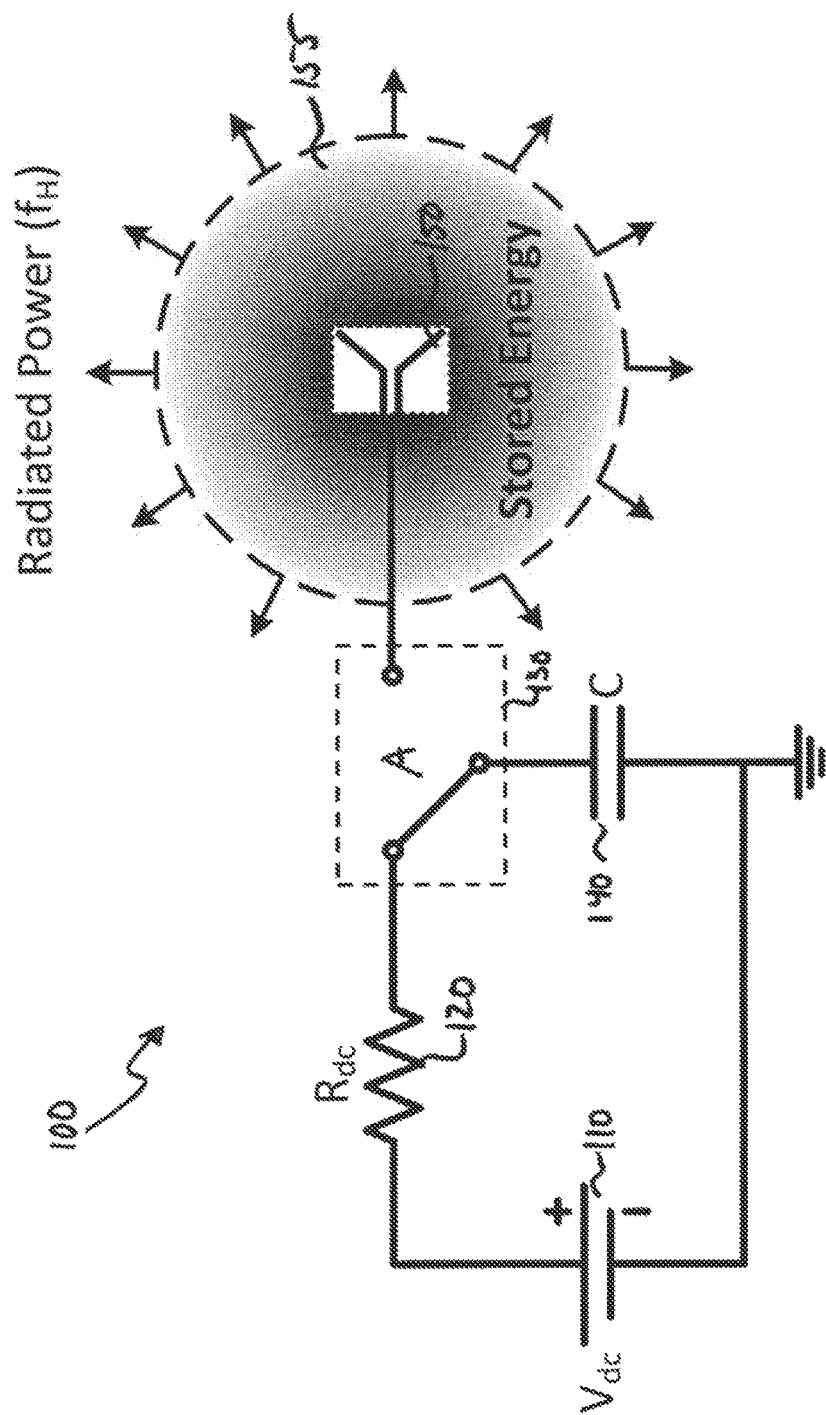

Referring now to FIGS. 1A through 1C there is illustrated a circuit 100, in accordance with an exemplary embodiment of the present invention. The circuit 100 comprises a source 110 of constant voltage, $V_{dc}$. Connected in series with one another and together in parallel with the source 110 is a resistor 120 having a resistance, $R_{dc}$, a switch 130, and a capacitor 140 having a capacitance, C. The circuit 100 further comprises an antenna 150. The antenna 150 is an electrically small antenna, e.g., an antenna whose ka factor is smaller than one, where k is wave number and a is the radius of the smallest enclosing sphere. In an exemplary embodiment, the switch 130 is a reflective single pole, double throw switch. Thus, the switch 130 comprises a single input and two outputs that are alternately coupled to the input. The switch 130 is chosen to be reflective so that when the input is connected to one of the outputs, the other of the outputs, i.e., the disconnected output, is not terminated so that it reflects any incoming power.

In FIG. 1A, the switch 130 is in a first position, designated in FIG. 1A as A, in which the antenna 150 is isolated from the capacitor 140 and in which the capacitor 140 is coupled to the resistor 120 and the source 110. The capacitor 140 is charged by the source 110. Thus, FIG. 1A illustrates the initial charging phase of the capacitor 140.

In FIG. 1B, the switch 130 is in a second position in which the capacitor 140 is isolated from the source 110 and coupled to the antenna 150 instead. Once the maximum electric energy is stored in the capacitor 140, the switch 130 is switched to the second position, designated in FIG. 1B as B, to provide an impulse-like excitation from the capacitor 140 to the antenna 150. Depending on the Q factor of the antenna 150 and the switching period of the switch 130, the entire or part of the stored energy within the capacitor 140 will be injected into the near-zone 155 of the antenna 150 (assuming no loss). Simultaneously, the antenna 150 starts to radiate the injected power in the form of an exponentially damped oscillation. Since the capacitor 140 contributes to the tuning mechanism, the frequency, $f_L$, of the power radiated by the antenna 150 is determined by the loading effect of the capacitor 140 on the antenna 150, as shown in FIG. 1B. Depending on the time constant of the fields, the radiated power stays above a certain level for a specific amount of time. The criteria for the lower limit of the radiated power may be determined by the required total radiated power. In sum, FIG. 1B illustrates the simultaneous application of a pulse of energy to the antenna 150 and tuning of the antenna 150

FIG. 1C illustrates the switch 140 again in the first position A in which the capacitor 140 is reconnected to the source 110 to be recharged. During this time, the energy stored in the antenna near-zone 155 provides the radiative power which exponentially decays. However, since the capacitor 140 is not connected to the antenna 150, the resonant frequency of the antenna 150 changes to $f_H$, which is the same as the original resonant frequency of the antenna 150 when decoupled from the capacitor 140.

If the period of switching of the switch 140 is short compared to the time constant of the field 155, the antenna 150 will radiate continuously while alternating between the two resonant frequencies, $f_L$ and $f_H$, and the radiated power will remain above a certain level. Minimum radiated power level is a function of switching speed. In other words, if the switching rate is high enough, the magnitude of the field 155 does not drop dramatically and the stored energy around the antenna 150 continues to radiate with slight variations in the magnitude. Since the stored energy is already built up in the near-zone, the variation of the resonant frequency at each switching state immediately appears in the far field and therefore the high-Q property of the antenna is not a limiting factor for the radiation bandwidth.

Figure 2:
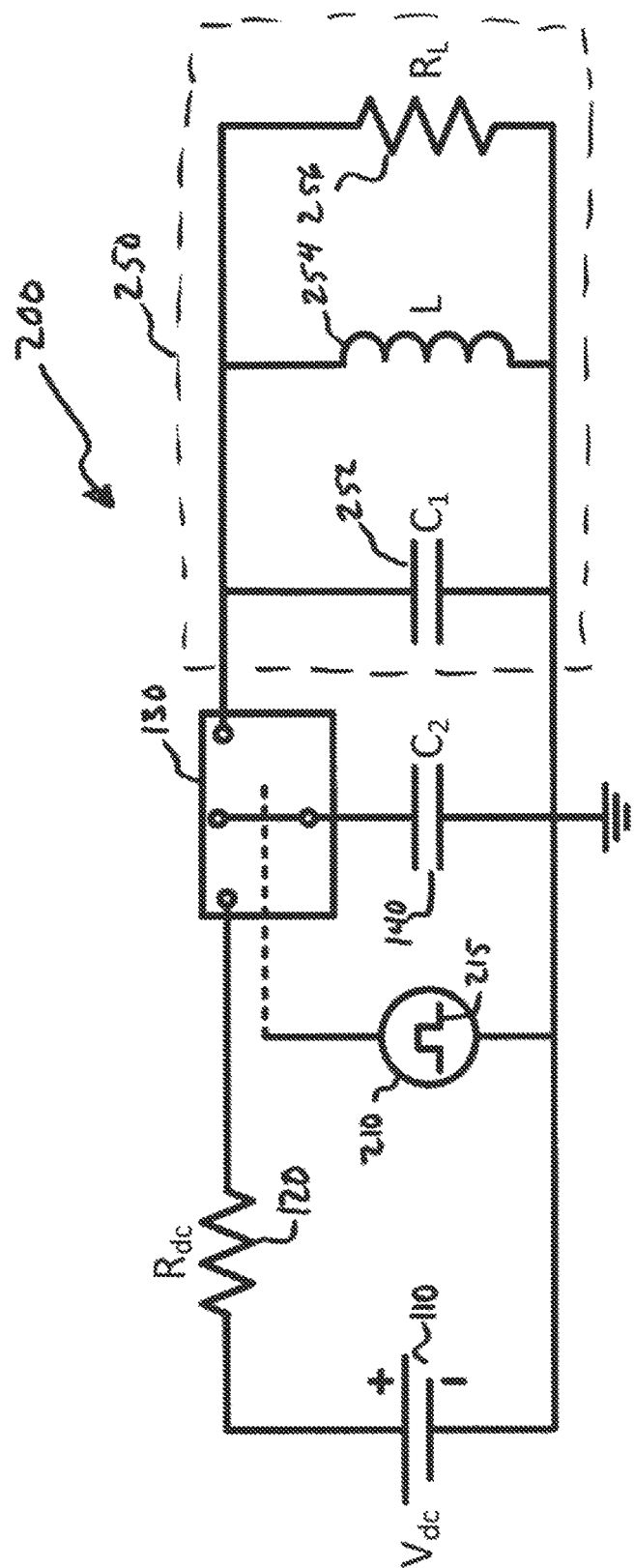
FIG. 2 illustrates a circuit model of the transmitter of FIGS. 1A-1C, the circuit model comprising a switched capacitor, an RLC resonator, a switch, and a source of constant voltage, in accordance with an exemplary embodiment of the present invention.

Referring now to FIG. 2, there is illustrated a circuit, generally designated as 200, that models the circuit 100, specifically the antenna 150 thereof, using equivalent electronic components, in accordance with an exemplary embodiment of the present invention. The circuit 200 comprises an equivalent circuit 250 for the antenna 150 of the circuit 100. The equivalent circuit 250 comprises a capacitor 252 having a capacitance, $C_1$, an inductor 254 having an inductance, L, and a resistor 256 having a resistance, $R_L$. The equivalent circuit 250 is a high-Q RLC resonator.

The circuit 200 further comprises the source 110 of constant voltage, $V_{dc}$, the resistor 120 having a resistance, $R_{dc}$, the switch 130, and the capacitor 140 having a capacitance, $C_2$ (to distinguish such capacitance from the capacitance, $C_1$, of the capacitor 252). Finally, the circuit 200 comprises a control signal source 210 that provides a switching signal 215 that controls the position of the switch 130.

The switch 130 switches the capacitor 140 between the source 110 and the resonator 250. The resistor 120 is the source impedance and plays an important role in determining the upper limit of the switching rate of the switch 130.

The switched capacitor 140 is not only a tuning component but also an intermediate element to collect electric charge from the source 110 during the charging phase and inject it into the resonator 250 during the discharging phase. The total charge accumulated in the switched capacitor 140 is used to excite the resonant frequency of the resonator 250. The resonant frequency is determined by L and the sum of $C_1$ and $C_2$. Therefore, an efficient power transfer from the source 110 to the load 250 occurs if the switching period is long enough such that the switched capacitor 140 is charged up to a certain maximum voltage level.

Because the time constant of the charging phase is equal to $R_{dc}C_2$, the source impedance, $R_{dc}$, must be small in order to achieve a high switching rate with an efficient power transfer. The switching moment here is intended to be when the capacitor 140 is sufficiently charged and its voltage is at maximum. In addition, if the voltage across the switched capacitor 140 is at the maximum at the beginning of charging phase. i.e., the moment that the capacitor 140 is connected to the source 110, the required time to achieve a full charge in the capacitor 140 can be substantially reduced. Thus, the switching rate can be increased.

EXAMPLE 1

The circuit 200 was simulated using the transient simulator of ADS software. The component values in the circuit 200 were chosen as follows: $C_1$=2546 pF, $C_2$=1431 pF, L=39.8 pH, $R_L$=50Ω, and $R_{dc}$=2Ω. These values resulted in two resonant frequencies, 400 MHz and 500 MHz, with Q factors equal to 500 and 400, when the switched capacitor 140 was connected to and disconnected from the RLC circuit 250, respectively.

Figure 3A:
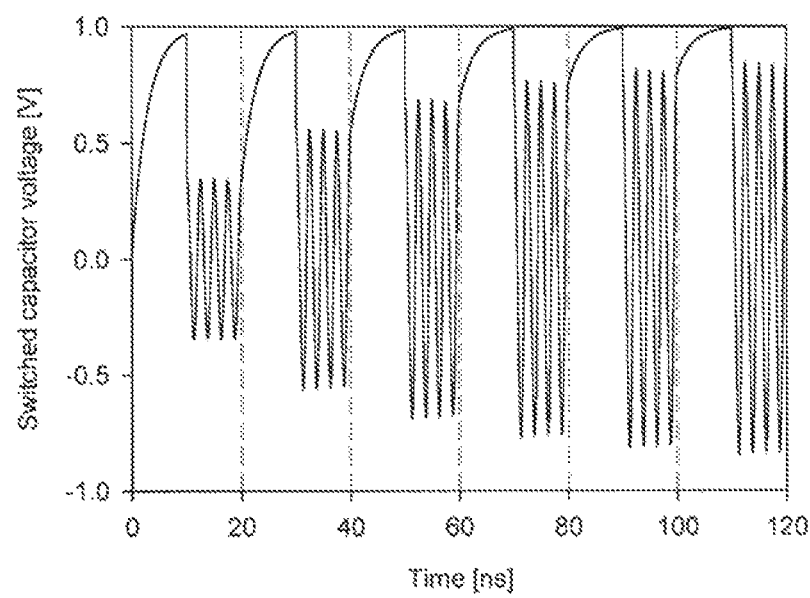
FIGS. 3A-3C respectively illustrate a voltage waveform across the switched capacitor of FIG. 2, a voltage waveform across the RLC resonator of FIG. 2, and power supplied by the source of constant voltage of FIG. 2 during initial switching cycles of the switched capacitor when energy stored in the switched capacitor is building up, in accordance with an exemplary embodiment of the present invention.
Figure 3B:
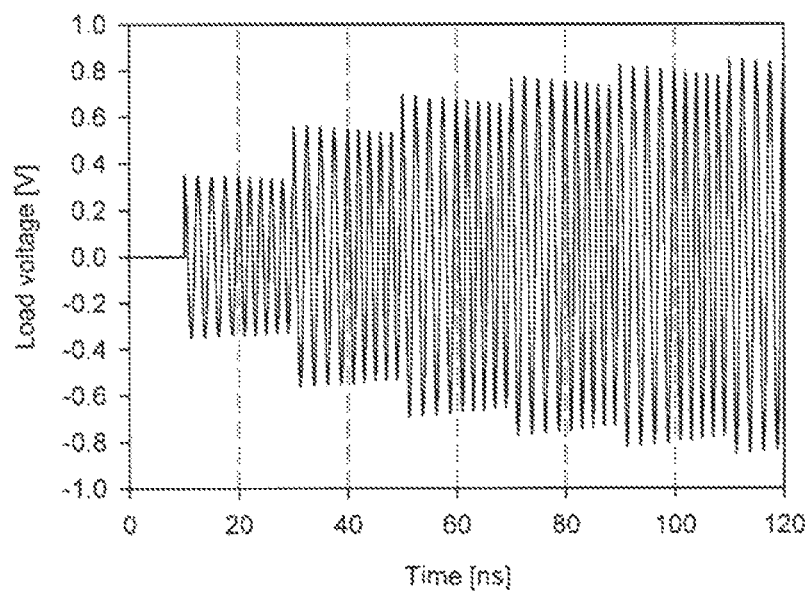
Figure 3C:
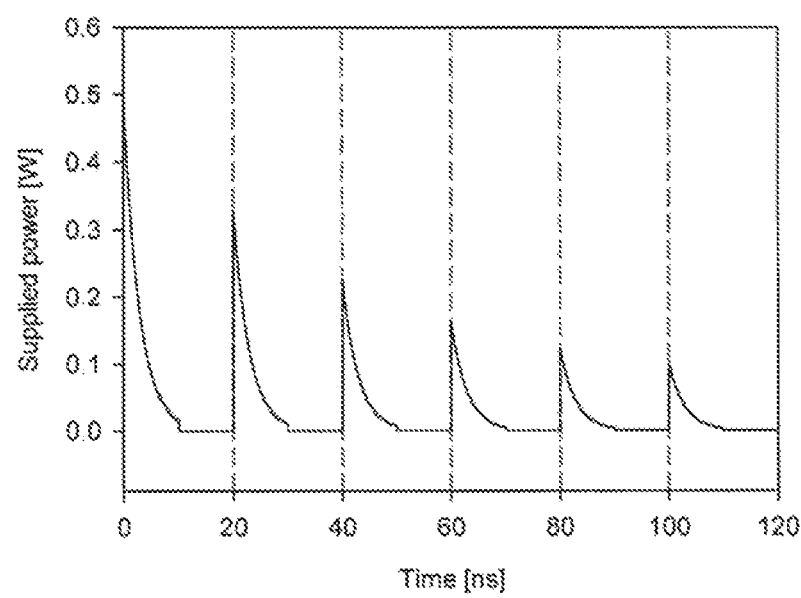
Figure 4A:
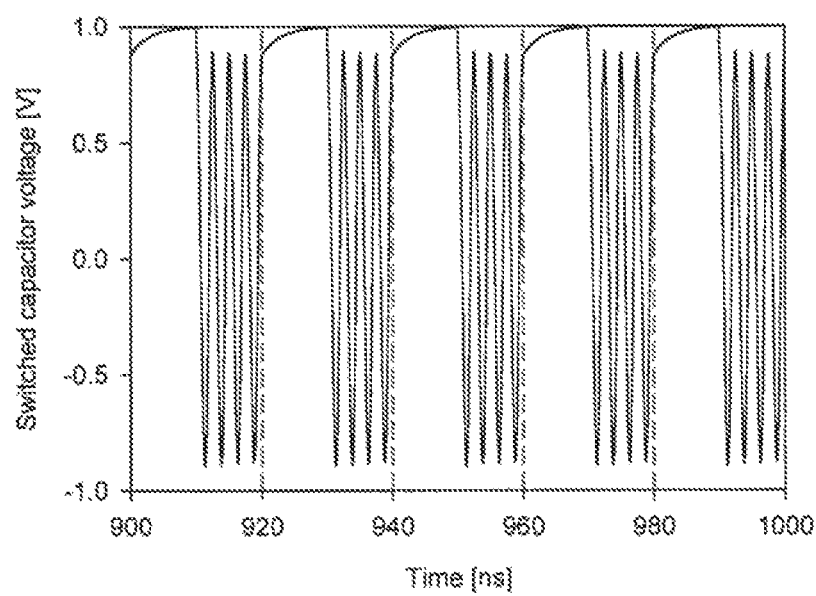
FIGS. 4A-4C respectively illustrate a voltage waveform across the switched capacitor of FIG. 2, a voltage waveform across the RLC resonator of FIG. 2, and power supplied by the source of constant voltage of FIG. 2 during switching cycles of the switched capacitor after which energy stored in the switched capacitor has built up, in accordance with an exemplary embodiment of the present invention.
Figure 4B:
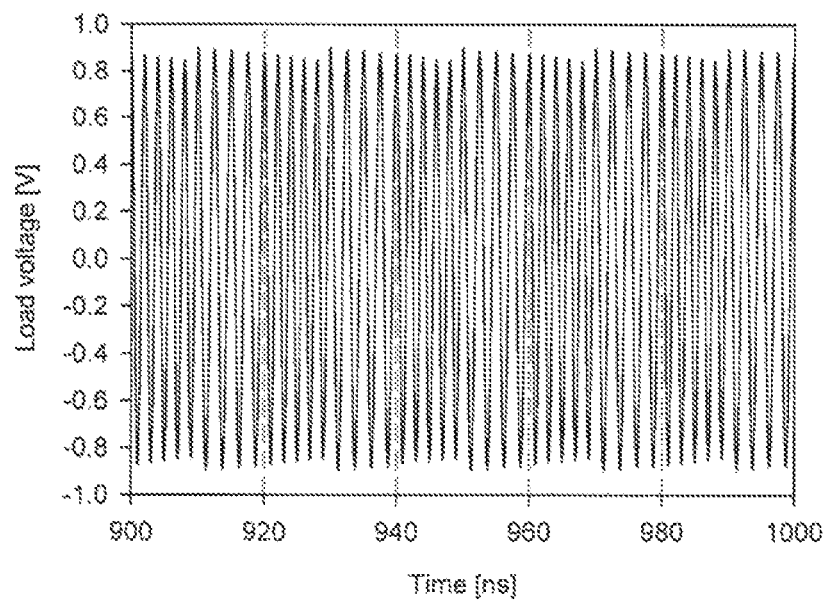
Figure 4C:
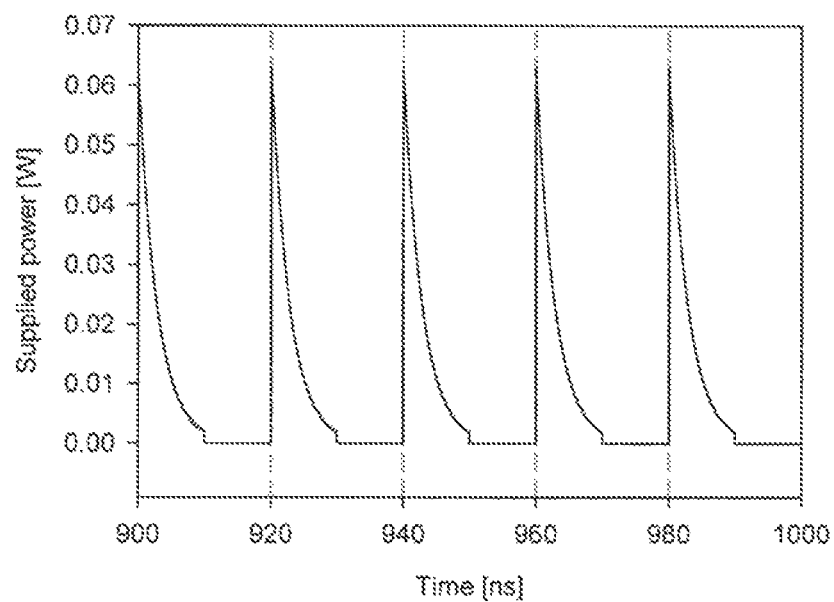

Within the first several cycles, the stored energy in the resonator 250 was built up and afterward, the charging and discharging phases were similarly repeated. FIGS. 3A-3C respectively show the voltage waveform across the switched capacitor 140, the voltage waveform across the load 250, and the power supplied by the source 110, which was simulated as a 1 V DC power supply, during initial switching cycles when the energy stored in the capacitor 140 was being built up. FIGS. 4A-4C respectively show the voltage waveform across the switched capacitor 140, the voltage waveform across the load 250, and the power supplied by the source 110, which was simulated as a 1 V DC power supply, during switching cycles after the energy stored in the capacitor 140 was built up.

The switching signal 215 used in the simulation was a 50 MHz periodic pulse with 50% duty cycle. In FIGS. 3A-3C, the plotted waveforms were the result of initial switching cycles of the switch 130 in which the stored energy in the LC pair (comprising the inductor 254, the capacitor 252, and the capacitor 140) was being built up. FIGS. 4A-4C show the same waveforms when the stored energy was already built up. It can be seen in FIG. 4B that the voltage at the load 250 was a frequency modulated waveform whose amplitude was close to 1 V for both frequencies. The voltage across the switched capacitor 140, as depicted in FIG. 4A, indicates that if the switching moment coincides with the maximum voltage, the charging time will be shorter than the case of zero voltage and therefore the rate of switching can be increased.

Figure 5:
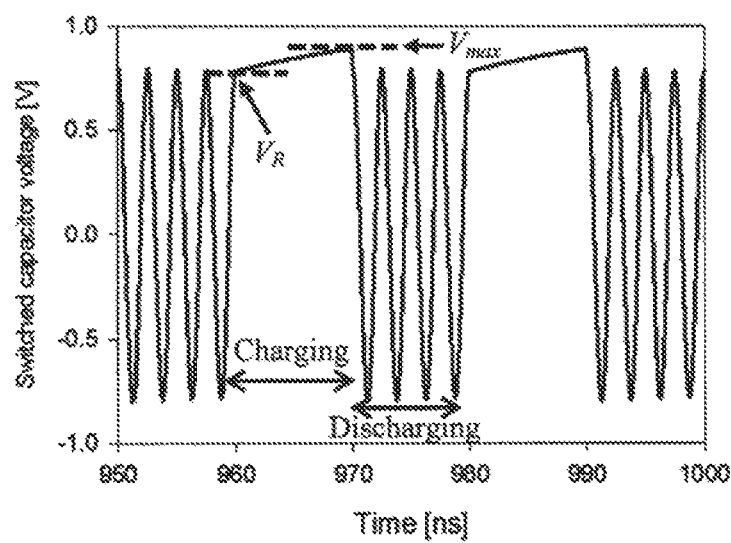
FIG. 5 illustrates a voltage waveform across the switched capacitor of FIG. 2 when the constant voltage provided by the source is 1 V, the resistance of the source is 10Ω, and the switch is switched at 50 MHz, in accordance with an exemplary embodiment of the present invention.

To study the impact of the source resistor 120 on the switching rate, a case in which the actual time for a full-charge is longer than the duration of the charging phase is considered. FIG. 5 shows the voltage of the switched capacitor 140 when the voltage of the source 110, $V_{dc}$, is 1 V; the resistance, $R_{dc}$, of the source 110 is 10Ω; and the frequency of the switching signal 215 is 50 MHz. The charging curve associated with the voltage of the switched capacitor 140 can be expressed as $$V_{cha} = V_{dc} - (V_{dc} - V_R)e^{-\frac{t'}{\tau_{cha}}}, \qquad (1.1)$$

where $V_R$ is the voltage of the switched capacitor 140 at the beginning of its charging phase, and t' is the delayed time originated at an arbitrary starting point of the charging phase. $\tau_{cha}$ is the charging time constant and is equal to $\tau_{cha}=R_{dc}C_2$. The envelope of exponentially decaying oscillations during the previous discharge phase can be represented by $$V_{discha} = V_{max}e^{-\frac{t'+T_b}{\tau_{discha}}}, \qquad (1.2)$$

where $V_{max}$ is the maximum voltage during the charging phase, and $T_b$ is the bit period which is equal to a half-pulse or charging/discharging duration.

The $\tau_{discha}$ is the discharging time constant and is equal to $\tau_{discha}=R_L(C_1+C_2)$. Equating (1.1) and (1.2) at t'=0 results in $$V_R = V_{max}e^{-\frac{T_b}{\tau_{discha}}}. \qquad (1.3)$$

Therefore, $t_0$, the required time for the switched capacitor voltage to rise from $V_R$ to $V_{max}$ can be found by substituting (1.3) into (1.1) as
or $$V_{max} = V_{dc} - (V_{dc} - V_{max} e^{-\frac{T_b}{\tau_{discha}}}) e^{-\frac{t_0}{\tau_{cha}}} \quad (1.4)$$

$$t_0 = R_{dc} C_2 \cdot \ln\left(\frac{V_{dc} - V_{max} e^{-\frac{T_b}{R_L(C_1+C_2)}}}{V_{dc} - V_{max}}\right). \quad (1.5)$$

Equation (1.5) gives the condition which in the bit-rate is sufficiently long such that the voltage of the switched capacitor 140 can reach from $V_R$ to $V_{max}$.

Because $T_b \geq t_0$, equation (1.5) can be rewritten as $$\frac{T_b}{\ln\left(\frac{V_{dc} - V_{max} e^{-\frac{T_b}{R_L(C_1+C_2)}}}{V_{dc} - V_{max}}\right)} \geq R_{dc} C_2. \quad (1.6)$$

Assuming $V_{max} = k V_{dc}$, since $$T_b = \frac{1}{2 f_s},$$

then (1.6) can be rewritten in terms of switching frequency as $$f_s \cdot \ln\left(\frac{1 - k e^{-\frac{1}{2 f_s R_L (C_1+C_2)}}}{1-k}\right) \leq \frac{1}{2 R_{dc} C_2}. \quad (1.7)$$

Figure 6:
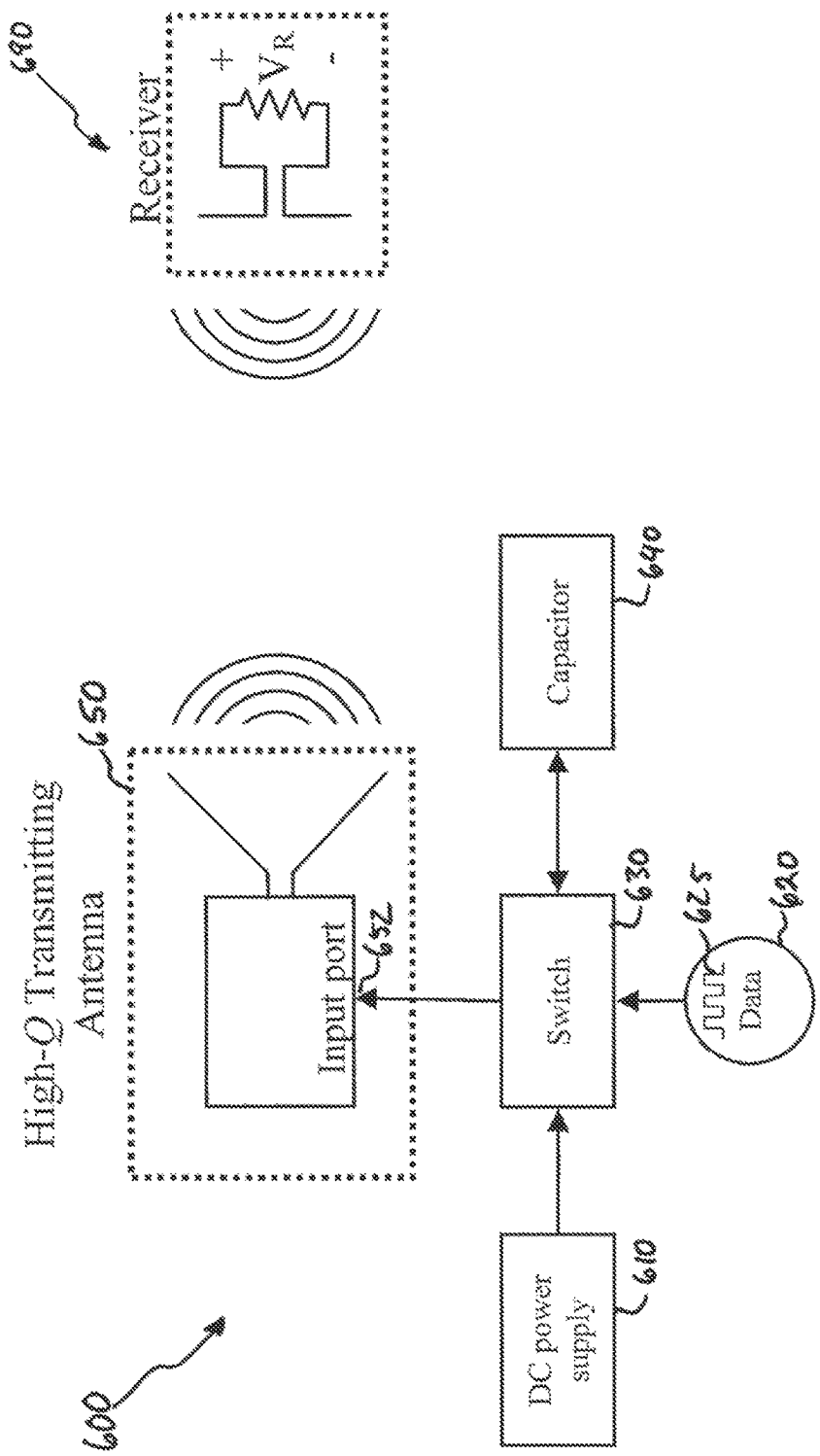
FIG. 6 illustrates a block diagram of a receiver and a transmitter comprising a switched capacitor, an antenna, and a source, in accordance with an exemplary embodiment of the present invention.

Referring now to FIG. 6, there is illustrated a block diagram of a transmitter 600 and a receiver 690, in accordance with an exemplary embodiment of the present invention. The transmitter 600 comprises a source 610 of constant or generally constant voltage. The transmitter 600 further comprises a switch 630 connected to an input port 652 of the antenna 650. The transmitter 600 also comprises a capacitor 640 connected to the switch 630 and a data source 620 providing a control signal 625 to the switch 630. The source 610 also is connected to the switch 630. The voltage source 610, data source 620, control signal 625, switch 630, capacitor 640, and antenna 650 correspond, respectively, to the voltage source 110, data source 210, control signal 215, switch 130, capacitor 140, and antenna 150 described above. Thus, the transmitter 600 and its constituent components behave in the aspects in which the circuits 100 and 200 and their constituents behave, as described above.

The electrostatic stored energy inside the capacitor 640 is used to energize the antenna 650 and send out a pulse when the switch 630 couples the capacitor 640 to the input port 652 of the antenna 650. The stored energy which is provided to the capacitor 640 by the power supply 610 when the switch 630 couples the power supply 610 to the capacitor 640 converts to a radiating energy in the form of damped resonating electromagnetic fields. The capacitor 640 is charged by the power supply 610 over a certain amount of time and then the stored energy is injected into the antenna 650 by the switch 630. However, if the antenna 650 is high-Q, a high amount of stored energy within the capacitor 640 will be stored again in the near-zone of the antenna 650 and a portion of it radiates. The near-field stored energy will keep radiating in an exponentially-decaying pattern while the antenna 650 is disconnected from the capacitor 640. The damping factor of the fields is inversely related to the Q factor of the antenna 650. Hence, if the antenna has a high Q, a small decay in the radiating power occurs during the time that the capacitor 640 is recharged by the power supply 610. The radiation mechanism of the transmitter 600 is illustrated in FIGS. 1A-1C and described with reference to these figures.

Figure 7A:
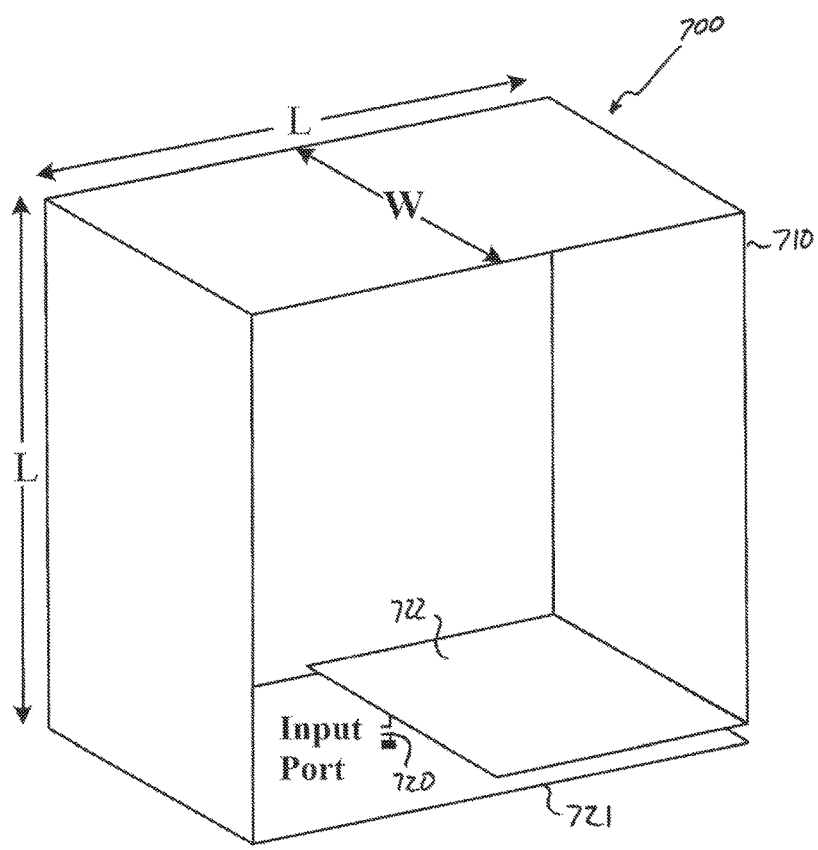
FIGS. 7A and 7B illustrate an exemplary embodiment of an Electrically-Coupled Loop Antenna (ECLA), in accordance with an exemplary embodiment of the present invention.
Figure 7B:
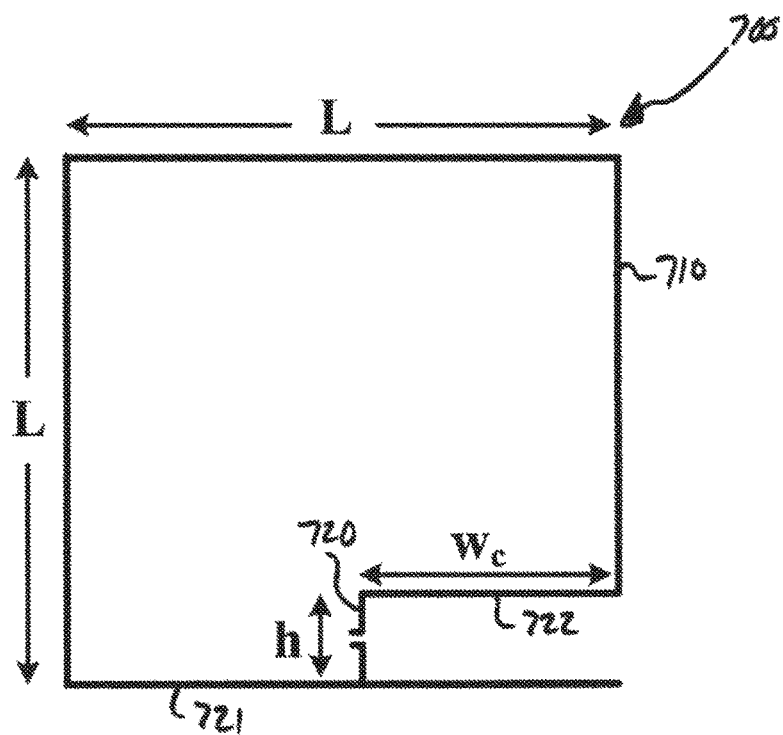

FIGS. 7A and 7B illustrate an exemplary embodiment of the antenna 150, 650, generally designated in FIGS. 7A and 7B as 700, in accordance with an exemplary embodiment of the present invention. The antenna 700 is an Electrically-Coupled Loop Antenna (ECLA).

The antenna 700 is formed from a loop conductor 710, having dimensions L×L×W. The loop conductor 710 comprises an input port 720 having a height, h. The input port 720 is formed between first and second lower arms 721, 722 of the loop 710 that overlap over a length, $w_c$, of the second lower arm 721. The second arm 722 forms a capacitive plate disposed over the first arm 721. The input port 720 is connected to the switch 130 in the circuit 100 or to the switch 630 in the transmitter 600. The antenna 700 is tuned and powered by loading the input port 720 with a charged or partially charged capacitor.

EXAMPLE 2

The transmitter 600 having an ECLA 700 as the antenna 650 was simulated in CST Microwave Studio and the scattering parameters were taken into Agilent ADS for transient simulations. The measuring probe, a dipole, was located 1 meter away from the simulated antenna in the E-plane to measure the electric field. The measuring dipole was aligned with the co-pol direction and terminated by a 100 KΩ resistor.

Figure 8:
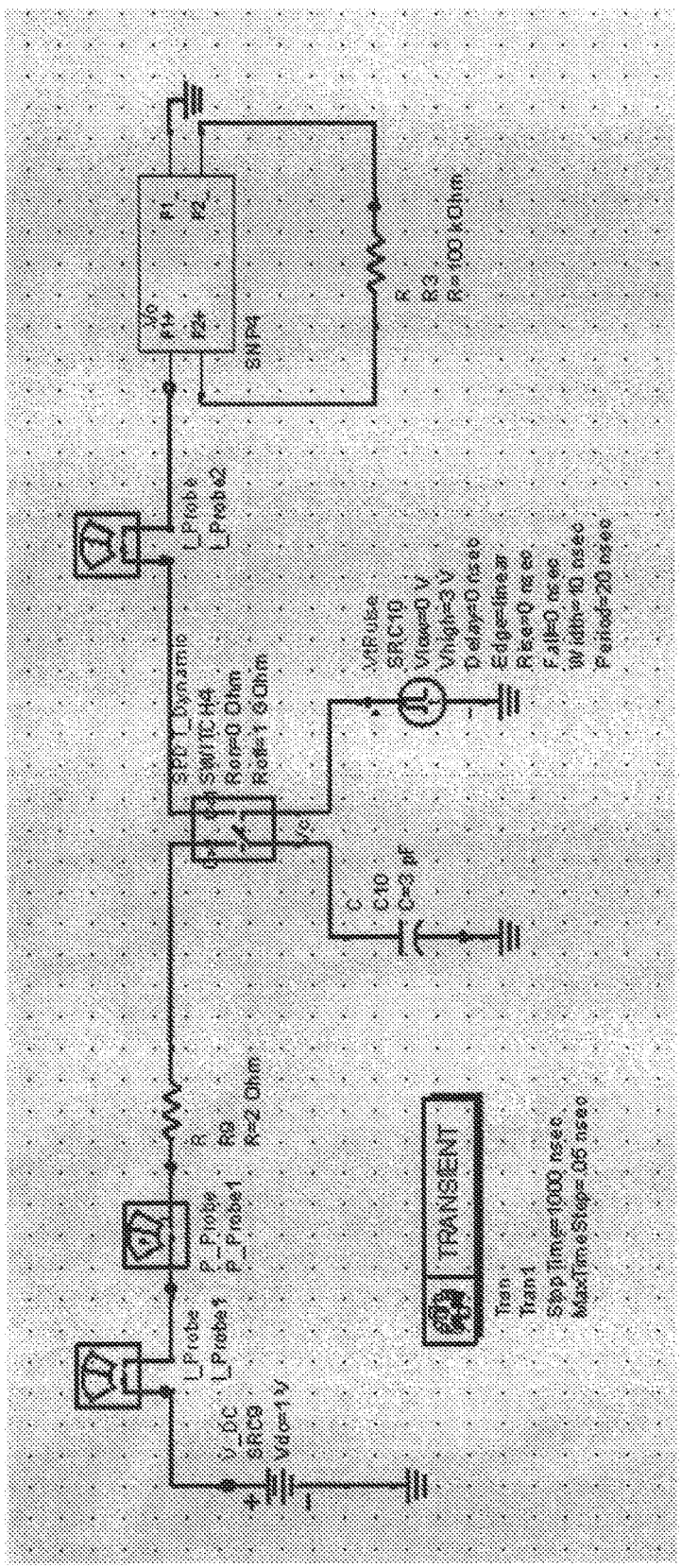
FIG. 8 illustrates a simulation of the transmitter of FIG. 6, in accordance with an exemplary embodiment of the present invention.
Figure 9A:
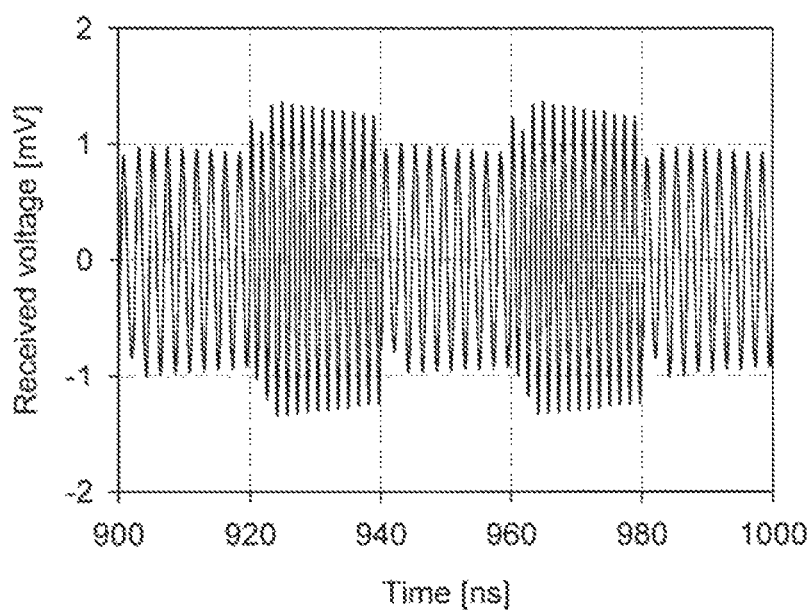
FIG. 9A illustrates a plot of a far-field voltage of the transmitter of FIG. 6, as simulated in FIG. 8, when the switched capacitor is switched at 25 MHz, in accordance with an exemplary embodiment of the present invention.
Figure 9B:
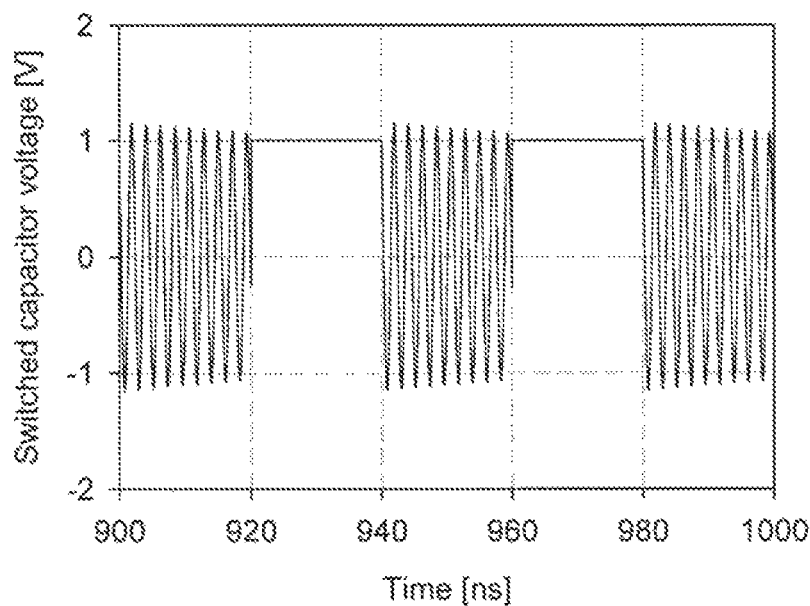
FIG. 9B illustrates a voltage waveform across the switched capacitor of FIG. 6, as simulated in FIG. 8, when the switched capacitor is switched at 25 MHz, in accordance with an exemplary embodiment of the present invention.
Figure 9C:
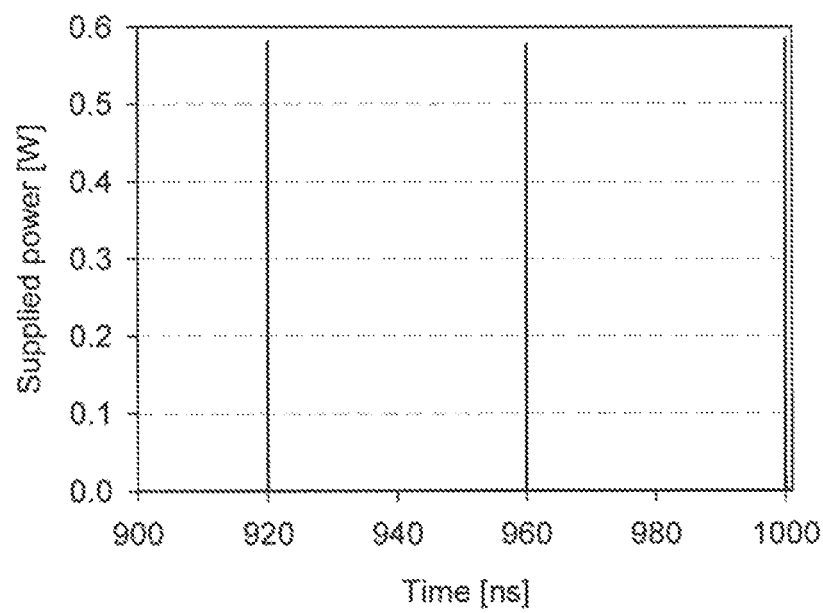
FIG. 9C illustrates power supplied by the source of FIG. 6, as simulated in FIG. 8, when the switched capacitor is switched at 25 MHz, in accordance with an exemplary embodiment of the present invention.
Figure 10A:
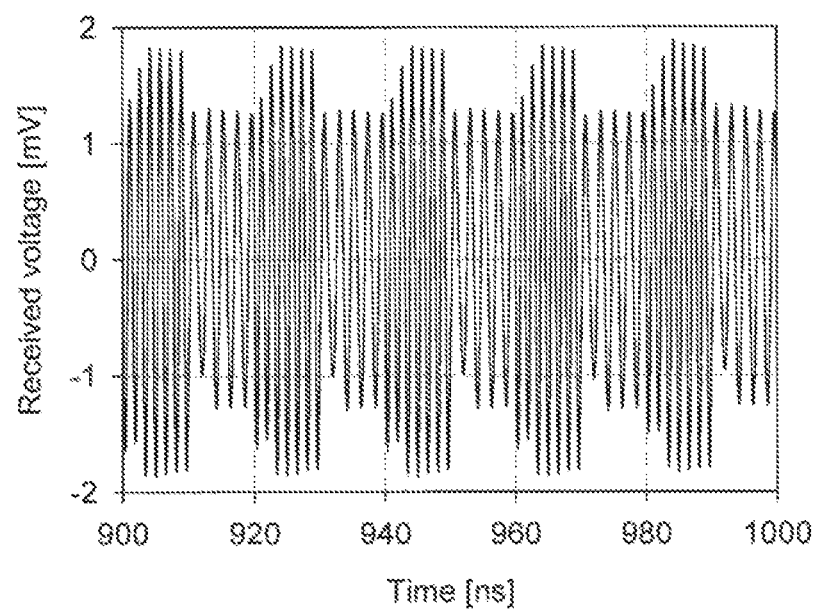
FIG. 10A illustrates a plot of a far-field voltage of the transmitter of FIG. 6, as simulated in FIG. 8, when the switched capacitor is switched at 50 MHz, in accordance with an exemplary embodiment of the present invention.
Figure 10B:
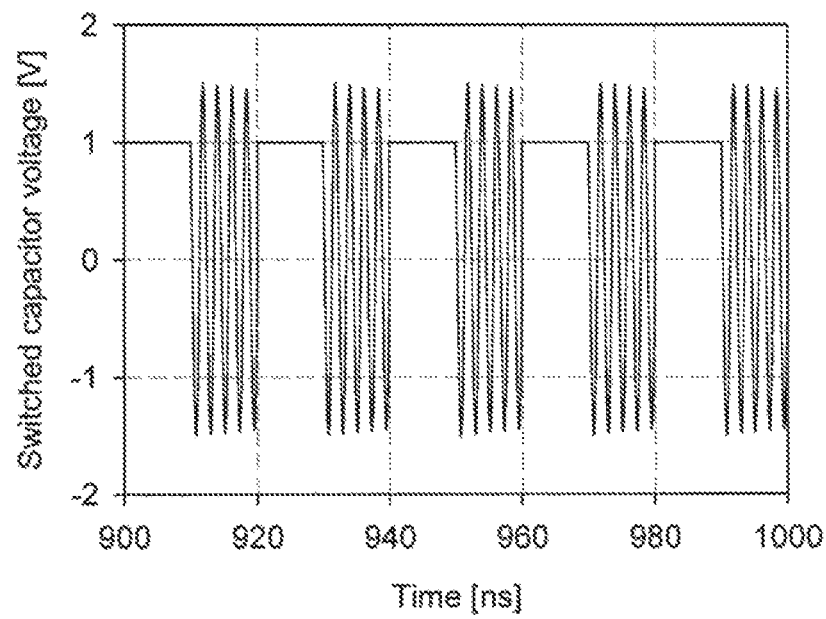
FIG. 10B illustrates a voltage waveform across the switched capacitor of FIG. 6, as simulated in FIG. 8, when the switched capacitor is switched at 50 MHz, in accordance with an exemplary embodiment of the present invention.
Figure 10C:
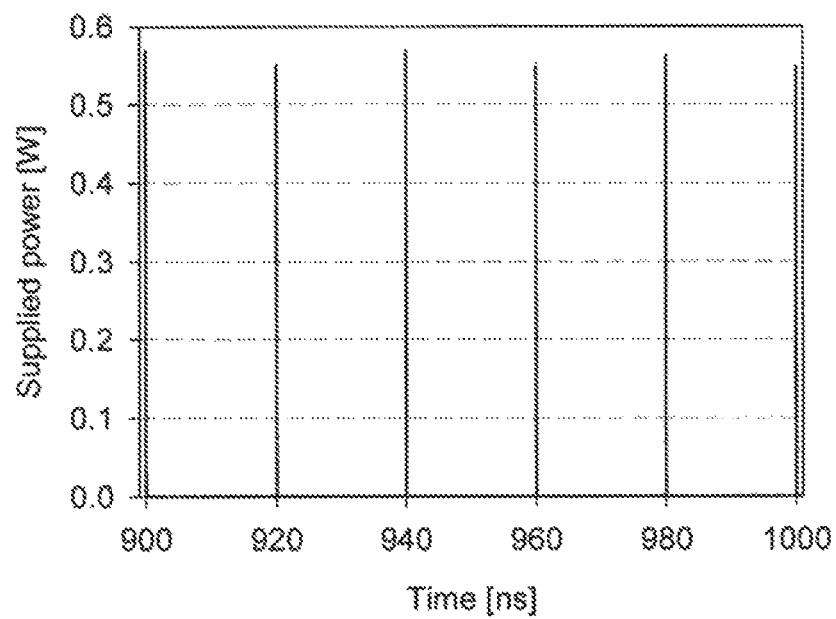
FIG. 10C illustrates power supplied by the source of FIG. 6, as simulated in FIG. 8, when the switched capacitor is switched at 50 MHz, in accordance with an exemplary embodiment of the present invention.

FIG. 8 shows the ADS circuit simulation set-up which used an ideal single pole-double throw (SPDT) switch to switch a 3 pF capacitor between the antenna and a 1 V DC power source with a 2Ω resistance. FIGS. 9A-9C show the received far field voltage, the voltage across the switched capacitor, and the power supplied by the DC source when the switching capacitor was switched at a switching frequency of 25 MHz. FIGS. 10A-10C show the far field, the voltage across the switched capacitor, and the power supplied by the DC source for a switching frequency of 50 MHz. It can be seen that the far field for both cases was an FSK modulated signal with the same rate as the switching. The carrier frequencies were around 458 MHz and 648 MHz.

The switched capacitor 640 voltage quickly approached the DC level in the charging phase and resonated during the discharging phase which indicates that it contributed to the resonant frequency of radiated fields. Since the switched capacitor 640 was small, the time constant of the charging capacitor 640 was very short (2×3 pF=6 ps) and hence, the DC resistance was not a limiting factor in this case. Instead, the Q factor of the antenna 650 was desirably high enough such that, during the charging phase of the switched capacitor 640, the far field benefitted from a small damping factor and the amount of power decay decreased.

In practical cases, a lower Q antenna is desirably switched at a higher rate to prevent the far field falling off to low levels. Therefore, higher Q will be a desirable design parameter which results in maintaining an almost consistent power in the far field. A very high-rate FSK modulation with desired frequencies is realized by a small antenna and a DC power source. The consumed power, as depicted in FIGS. 9C and 10C, shows that, due to the current spikes which occur once per a switching cycle, an impulse-like power is transferred from the source 610 to the antenna 650 at the beginning of every charging phase, provided that a high-Q switched capacitor is used. Nevertheless, a continuous radiation is achieved by using the stored energy within the near-field (during the charging phase) and the stored energy within the switched capacitor 640 (during the discharging phase) and simultaneously the resonant frequency can be tuned according to the switched capacitance.

EXAMPLE 3

The transmitter 600 was prototyped to test its performance. An ECLA was prototyped according to FIGS. 7A and 7B with dimensions L=5 cm, W=1.5 cm, $w_c$=1.5 cm, and h=0.79 mm for use as the antenna 650. Switching circuitry, supported by a Rogers RT/Duroid 5870 substrate with thickness 31 mils and dielectric constant 2.33, was also prototyped for use in the transmitter 600. An SPDT switch, a HMC194MS8 from Hittite Microwave Corp. which is a reflective switch (i.e. open circuit when off, versus absorptive switches which are terminated by a matched load when off) with On/Off time about 24 ns (which supports a switching frequency up to 40 MHz), was used as the switch 630. It should be noted that it is desirable to use a reflective switch as the switch 630 in the transmitter 600 because, during the discharging phase, the power source, e.g., a battery, is open circuited and, therefore, no power is consumed. Also, during the charging phase, the ECLA 650 is open circuited with a higher Q compared to the case when it is terminated by a 50Ω load.

A 3 V DC power source was used as the power source 610. A 10 pF capacitor was chosen for the capacitor 640. It was switched between the 3 V DC power source 610 and the input port 720 of the ECLA 650.

Figure 11A:
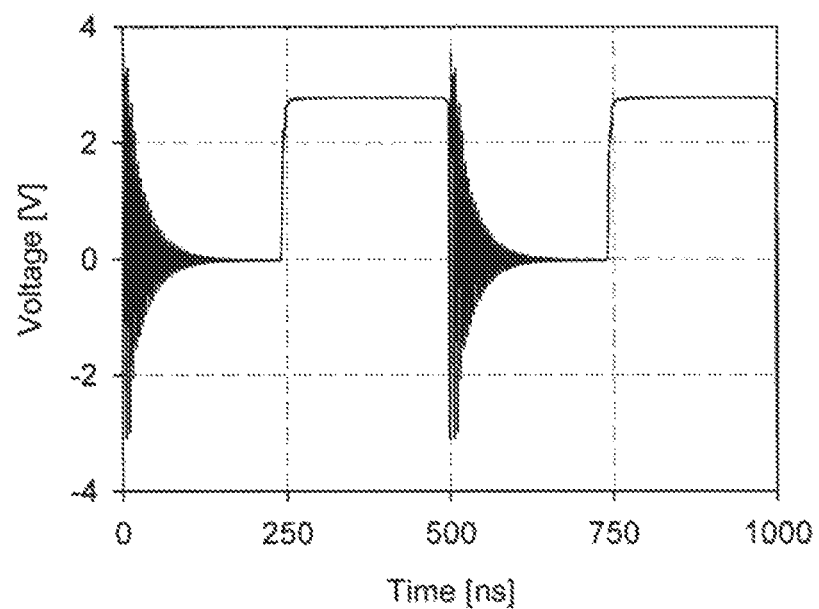
FIG. 11A illustrates a voltage waveform across the switched capacitor of FIG. 6, when the transmitter of FIG. 6 was prototyped using an ECLA as the antenna and the switched capacitor was switched at 2 MHz, in accordance with an exemplary embodiment of the present invention.
Figure 11B:
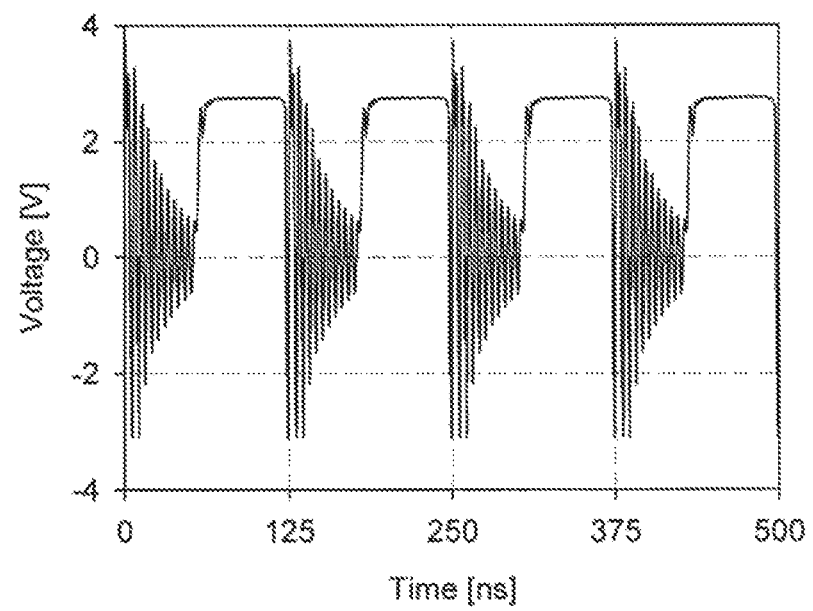
FIG. 11B illustrates a voltage waveform across the switched capacitor of FIG. 6, when the transmitter of FIG. 6 was prototyped using an ECLA as the antenna and the switched capacitor was switched at 8 MHz, in accordance with an exemplary embodiment of the present invention.
Figure 12A:
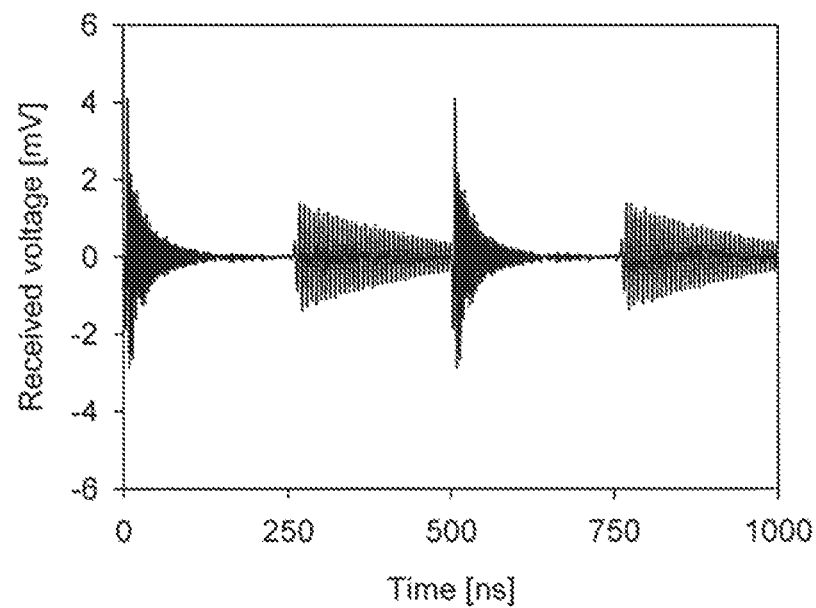
FIGS. 12A-12F illustrate measured voltages at a receiving dipole used to measure an electrical field produced by the transmitter of FIG. 6 when prototyped using an ECLA as the antenna at different switching frequencies, respectively 2 MHz, 4 MHz, 8 MHz, 12 MHz, 20 MHz, and 25 MHz, in accordance with an exemplary embodiment of the present invention.
Figure 12B:
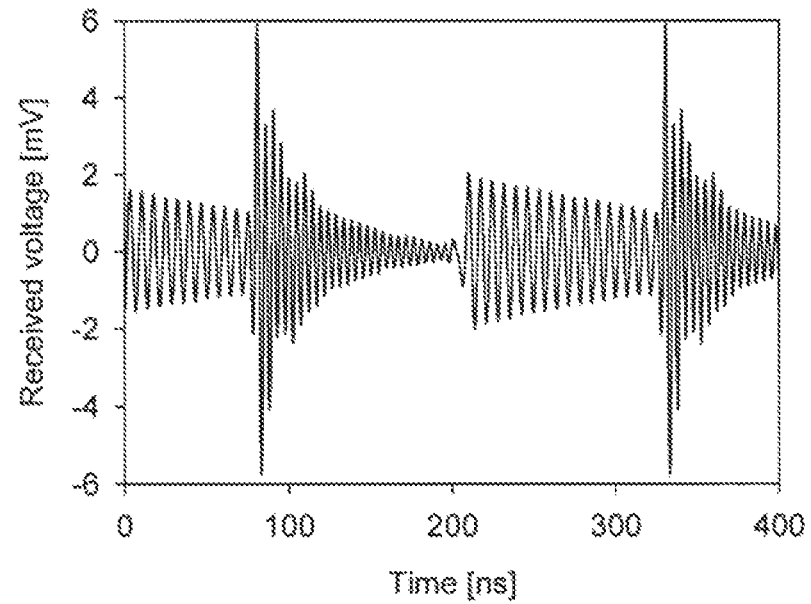
Figure 12C:
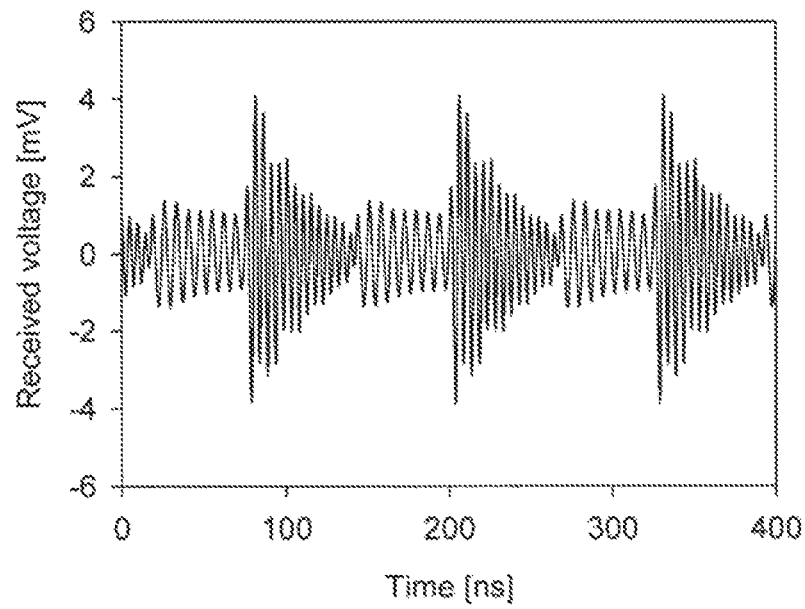
Figure 12D:
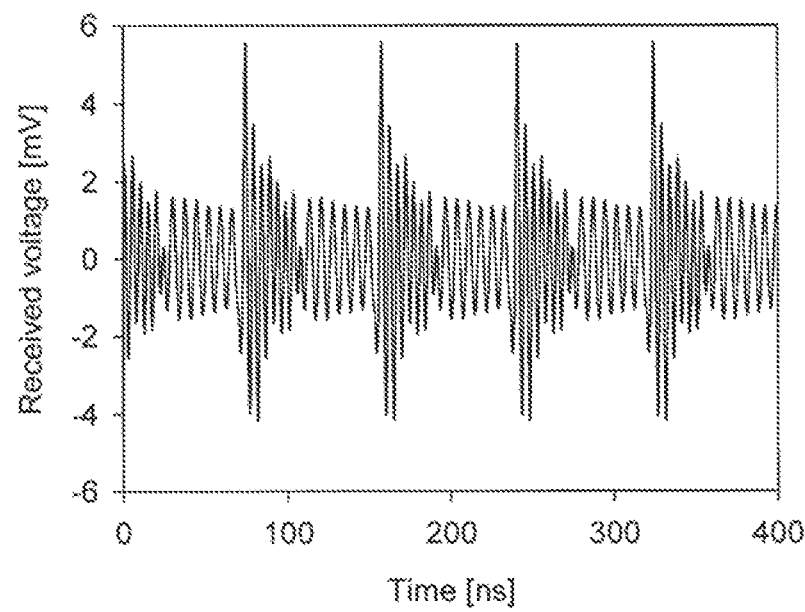
Figure 12E:
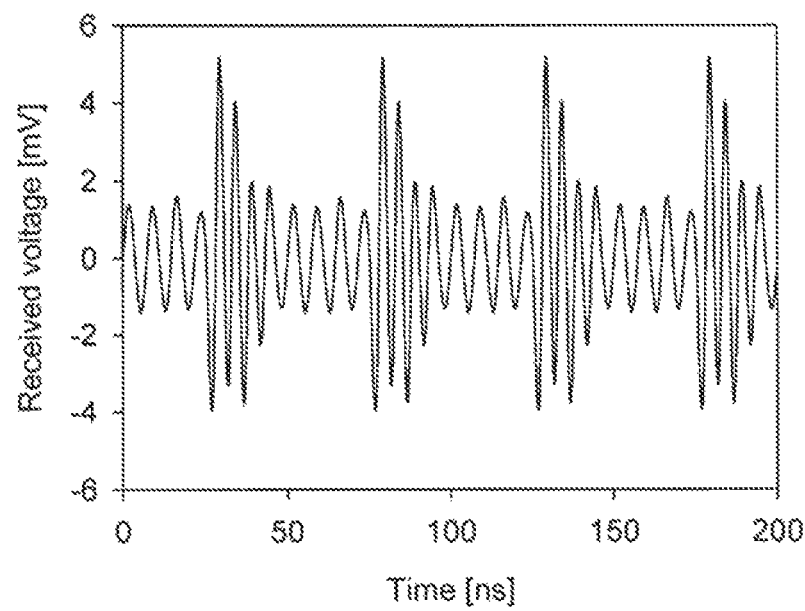
Figure 12F:
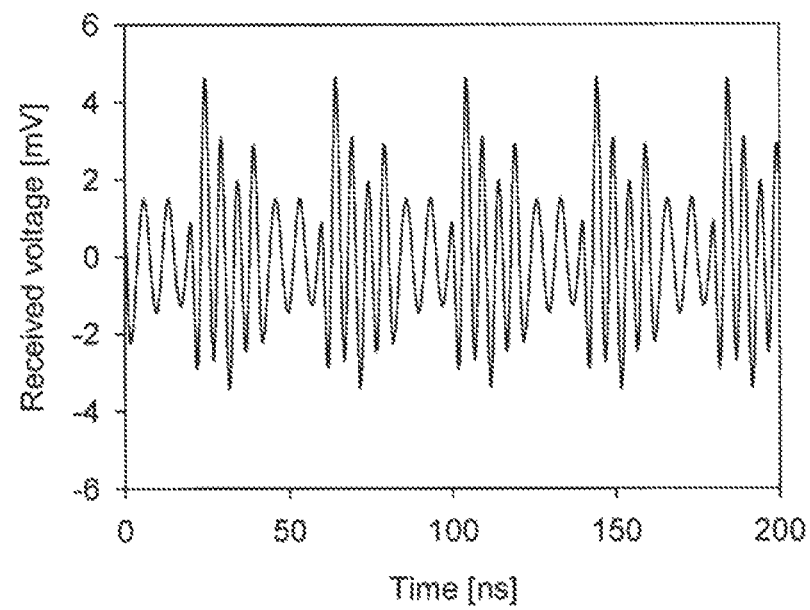

The voltage across the switched capacitor 640 is shown in FIGS. 11A and 11B for two switching frequencies, 2 MHz and 8 MHz, respectively. As expected, the capacitor 640 stored the electric energy by collecting electric charges during the charging phase and transferred the energy to the ECLA 650 during the discharging phase and at the same time contributed to the resonance of the antenna 650 and caused a continuous FSK signal whose rate was a function of switching frequency rather than the antenna 650 bandwidth. Two resonant frequencies were measured, about 140 MHz and 205 MHz for the loaded and unloaded antenna 650, respectively.

FIGS. 12A-12F show the measured voltage at a receiving dipole at different switching frequencies, respectively 2 MHz, 4 MHz, 8 MHz, 12 MHz, 20 MHz, and 25 MHz. As illustrated in the measurement results, a switching rate of 25 MHz (50 Mb/s) can be easily obtained and it can be even further increased by using a low-loss switch with improved performance along with a high-Q capacitor.

EXAMPLE 4

Above, an exemplary embodiment of the antenna 150, 650 as an ECLA is described. Other exemplary embodiments of the antenna 150, 650 are contemplated. For example, in another exemplary embodiment, the antenna 150, 650 is a Planar Inverted-F Antenna (PIFA).

Figure 13A:
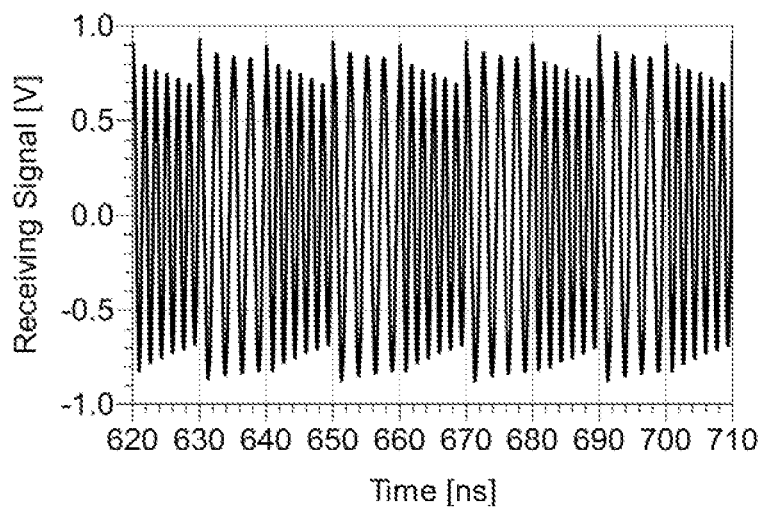
FIG. 13A illustrates a radiated/received voltage in the time domain in a prototype of the transmitter of FIG. 6 in which the antenna was prototyped as a Planar Inverted-F Antenna (PIFA), in accordance with an exemplary embodiment of the present invention.
Figure 13B:
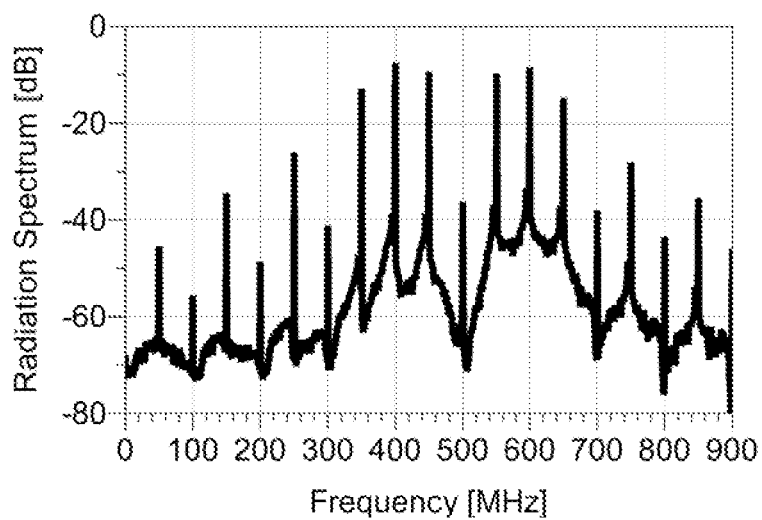
FIG. 13B illustrates a radiated/received voltage in the frequency domain in a prototype of the transmitter of FIG. 6 in which the antenna was prototyped as a PIFA, in accordance with an exemplary embodiment of the present invention.
Figure 14:
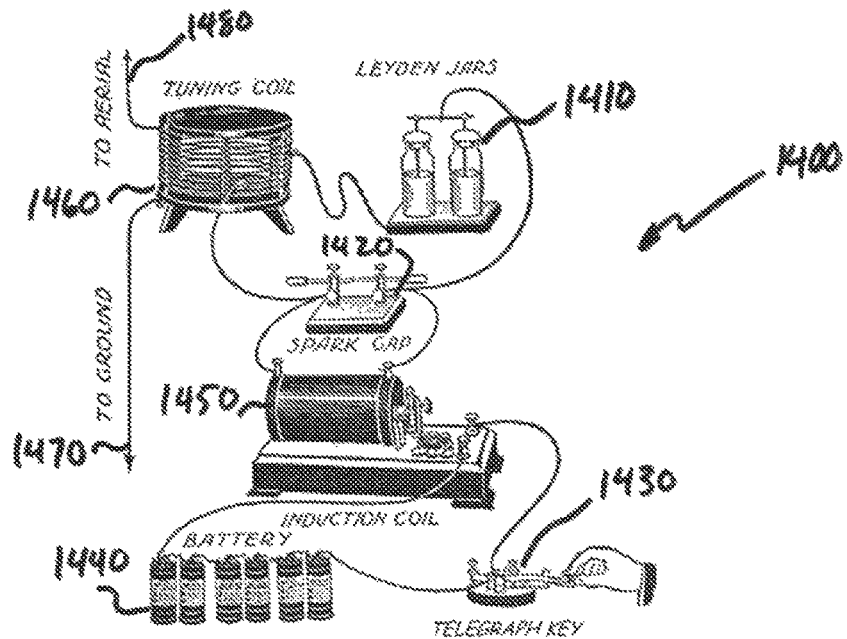
FIG. 14 illustrates a conventional spark-gap transmitter.
Figure 15:
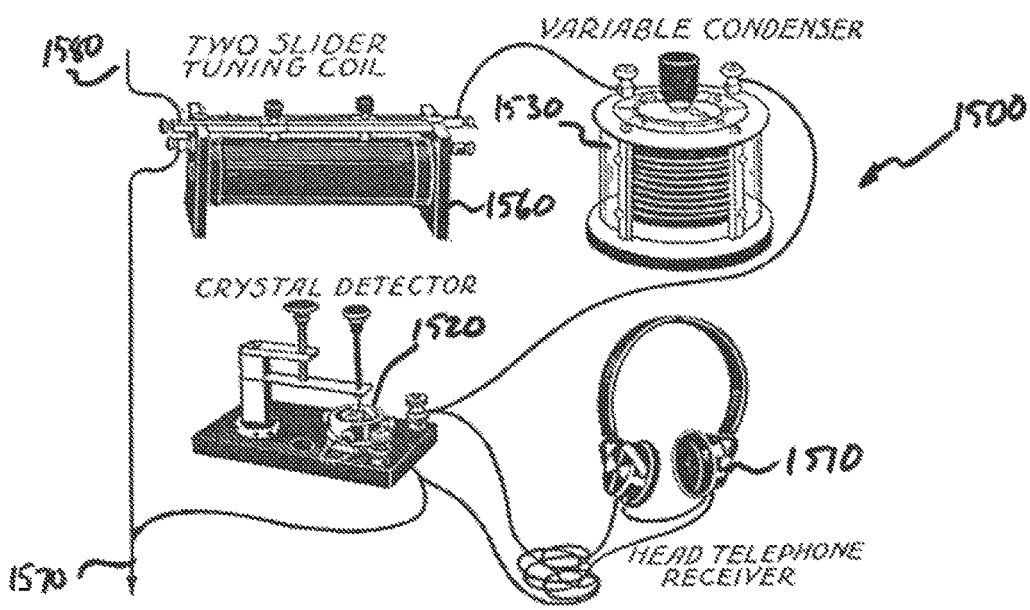
FIG. 15 illustrates a conventional receiver used to receive wireless transmissions from the conventional spark-gap transmitter of FIG. 14.

A simulation of the transmitter 600 having a PIFA as the antenna 650 was conducted. The capacitor 640 was chosen to be 4 pF. The switch 630 was switched at a rate of 50 MHz. The power supply 610 was a 1 V DC source. The self-resonance frequency of the PIFA 650 was 600 MHz. When loaded by the 4 pF capacitor, the resonance frequency of the PIFA 650 changed to 400 MHz. The Q factors for the antenna 650 were 63 at the 600 MHz resonance frequency and 112 at the 400 MHz resonance frequency. A smooth FSK signal was obtained at the receiving side, as illustrated in FIGS. 13A and 13B, which illustrate the radiated/received voltage in the time domain and frequency domain, respectively.

CONTEMPLATED USES AND CONCLUSION

The exemplary embodiments and examples described herein demonstrate a minimized architecture for high-rate transmission through a small antenna. It is shown that since a transient radiation can be achieved by an initial excitation of the antenna, a DC power supply can be applied to excite the fundamental resonance of the antenna at the input port of the antenna. No voltage controlled oscillator or variable voltage source is needed to excite the antenna. Rather, a switched capacitor is used to transfer the energy from the DC source to the antenna and provide a fast frequency-shift keying (FSK) modulation. This technique directly utilizes the DC power supply to deliver the radiation power with minimum number of components and hence, the overall size of the transmitter is reduced. Furthermore, the source of constant voltage, e.g., a battery, is used only to charge the switched capacitor and therefore has a very short duty cycle if the capacitor is high-Q.

Embodiments of the transmitter herein are contemplated for use in high-temperature environments, such as in a jet engine or at the tip of a drill bit used for drilling an oil well. In such embodiments, the power source can be replaced with a thermocouple junction. Other contemplated uses include electric turbines and motors or in the automotive industry. The embodiments of the transmitters described herein may be used for any application in which a low-cost transmitter may be used. The transmitters described herein are low cost because they do not use sophisticated RF components.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A circuit for tuning a resonance frequency of an electrically small antenna and directly exciting the electrically small antenna, the circuit comprising:
    a first source configured for providing a constant voltage;
    an antenna; and
    a switched capacitor configured for being alternately coupled to the first source to be charged thereby and to the antenna for exciting the antenna.

2. The circuit of claim 1, further comprising a second source configured for providing a switching signal, wherein the switched capacitor is configured for being alternately coupled to the first source to be charged thereby and to the antenna for exciting the antenna based on the switching signal.

3. The circuit of claim 2, further comprising a switch configured for alternately coupling the switched capacitor to the first source to be charged thereby and to the antenna for exciting the antenna based on the switching signal.

4. The circuit of claim 3, wherein the second source is configured for providing the switching signal to the switch to control the switch to alternately couple the switched capacitor to the first source to be charged thereby and to the antenna for exciting the antenna based on the switching signal.

5. The circuit of claim 3, wherein a time period between switching of the switch is greater than a time required to fully charge the switched capacitor.

6. The circuit of claim 1, wherein a time period between switching of the switch is greater than a time required to fully charge the switched capacitor.

7. The circuit of claim 1, wherein a time period between switching of the switch is less than a decay time constant of an electrical field emitted by the antenna.

8. The circuit of claim 1, wherein the antenna is an electrically-coupled loop antenna.

9. The circuit of claim 1, wherein the antenna is a planar inverted-f antenna.

10. A transmitter comprising:
a first source configured for providing a constant voltage;
an antenna; and
a switched capacitor configured for being alternately coupled to the first source to be charged thereby and to the antenna for exciting the antenna and for tuning a resonance frequency of the antenna.

11. The transmitter of claim 10, further comprising a second source configured for providing a switching signal, wherein the switched capacitor is configured for being alternately coupled to the first source to be charged thereby and to the antenna for exciting the antenna based on the switching signal.

12. The transmitter of claim 11, further comprising a switch configured for alternately coupling the switched capacitor to the first source to be charged thereby and to the antenna for exciting the antenna based on the switching signal.

13. The transmitter of claim 12, wherein the second source is configured for providing the switching signal to the switch to control the switch to alternately couple the switched capacitor to the first source to be charged thereby and to the antenna for exciting the antenna based on the switching signal.

14. The transmitter of claim 12, wherein a time period between switching of the switch is greater than a time required to fully charge the switched capacitor.

15. The transmitter of claim 10, wherein a time period between switching of the switch is greater than a time required to fully charge the switched capacitor.

16. The transmitter of claim 10, wherein a time period between switching of the switch is less than a decay time constant of an electrical field emitted by the antenna.

17. The transmitter of claim 10, wherein the antenna is an electrically-coupled loop antenna.

18. The transmitter of claim 10, wherein the antenna is a planar inverted-f antenna.

* * * * *